(12) United States Patent
Peterson et al.

(10) Patent No.: US 11,524,266 B1
(45) Date of Patent: Dec. 13, 2022

(54) METAL-ORGANIC FRAMEWORK/POLYMER FOAM COMPOSITE MATERIALS AND THEIR USES IN DECONTAMINATION AND/OR BALLISTIC PROTECTION

(71) Applicant: Combat Capabilities Development Command, Chemical Biological Center, APG, MD (US)

(72) Inventors: Gregory W Peterson, Belcamp, MD (US); Joseph L Lenhart, Port Deposit, MD (US); Randy A Mrozek, Port Deposit, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 477 days.

(21) Appl. No.: 16/778,557

(22) Filed: Jan. 31, 2020

(51) Int. Cl.
| | |
|---|---|
| *B01D 69/14* | (2006.01) |
| *A62D 3/33* | (2007.01) |
| *A62D 3/37* | (2007.01) |
| *A62D 3/35* | (2007.01) |
| *B01D 69/02* | (2006.01) |
| *A62D 3/38* | (2007.01) |
| *B01D 71/24* | (2006.01) |
| *A62D 101/26* | (2007.01) |
| *A62D 101/02* | (2007.01) |
| *C01B 3/00* | (2006.01) |
| *C01B 39/00* | (2006.01) |

(52) U.S. Cl.
CPC ............ *B01D 69/147* (2013.01); *A62D 3/33* (2013.01); *A62D 3/35* (2013.01); *A62D 3/37* (2013.01); *A62D 3/38* (2013.01); *B01D 69/02* (2013.01); *B01D 71/24* (2013.01); *A62D 2101/02* (2013.01); *A62D 2101/26* (2013.01); *B01D 2323/28* (2013.01); *B01D 2325/02* (2013.01); *C01B 3/0015* (2013.01); *C01B 39/00* (2013.01)

(58) Field of Classification Search
None
See application file for complete search history.

(56) References Cited

U.S. PATENT DOCUMENTS

2019/0217517 A1\* 7/2019 Erikson .................. B33Y 70/00

FOREIGN PATENT DOCUMENTS

EP            3251742    \*   6/2017

OTHER PUBLICATIONS

Kraton "Versatile Solutions for Synthetic & Natural Based Oils". 2021. (Year: 2021).\*
Kraton Kraton (TM) G1652 M Polymer Data Document. 2019. (Year: 2019).\*

\* cited by examiner

*Primary Examiner* — Sheng H Davis
(74) *Attorney, Agent, or Firm* — Ulysses John Biffoni

(57) ABSTRACT

A composite material is provided comprising a porous polymeric matrix having metal-organic framework (MOF) domains dispersed within the porous polymeric matrix, each of said MOF domains in fluid communication with the external environment through the pores in the porous polymeric matrix. A process of using the composite material to chemically modify or detoxify a chemical warfare agent or a toxic industrial chemical is also provided. The chemical warfare agent or the toxic industrial chemical is brought into contact with a MOF domain within the porous polymeric matrix so that the MOFs adsorb and chemically modify the chemical warfare agent or the toxic industrial chemical. A process for producing such a composite material is also disclosed.

17 Claims, 7 Drawing Sheets

METAL-ORGANIC FRAMEWORK/POLYMER FOAM COMPOSITE MATERIALS AND THEIR USES IN DECONTAMINATION AND/OR BALLISTIC PROTECTION

GOVERNMENT INTEREST

The invention described herein may be manufactured, used and licensed by or for the U.S. Government.

FIELD OF THE INVENTION

The invention relates to porous sorbents, specifically metal-organic frameworks (herein referred to as MOFs), and their incorporation into a polymeric open celled foam to form a composite. The composite is active towards toxic chemicals, including chemical warfare agents, and could be used as a filter, a decontamination device, or a sensor. In addition, the composite material can also function as a duel use protective device that also provides physical protection against shock waves. The present invention has application with respect to military warfare materials, pesticides, herbicides, air filtration and wastewater treatment.

BACKGROUND OF THE INVENTION

Metal-organic frameworks (MOFs) are porous inorganic-organic hybrid crystalline materials formed by metal ions or metal clusters connected by covalent bonds between metal orbitals and organic ligands. Accordingly, MOFs have properties of both organic and inorganic materials. Attractive aspects of MOFs are high porosity, well-regulated and tunable pore structure, and tunable structural diversity. MOF membranes and composite materials are characterized by high throughput, and applications include membrane filtration of liquid and gaseous media.

MOFs are a class of materials currently being widely investigated in various fields, such as separations, storage, catalysis, filtration, decontamination, and sensing, among others. MOFs are comprised of secondary building units (SBU), typically made from metal oxide clusters) connected by organic linkers. The resulting structure is an extended, 3-dimensional framework that is often highly porous. Due to the ability to change/tune both the SBU (e.g., changing metal type) and organic linker (e.g. putting functional groups on the linker, using larger/bulkier/longer linkers), an incredibly broad range of structures is possible.

There are multiple sub-groups of MOFs, such as isoreticular MOFs (IRMOFs), MIL (Materials Institute Lavoisier) MOFs, zeolitic imidazolate frameworks (ZIFs), and others. Typically, these groups are based on similarities of the structures. For example, most of the IRMOFs contain zinc acetate SBUs, and changing the linker results in a wide range of porous structures. However, IRMOFs in particular are not stable to water.

UiO-66-type MOFs are structures originally synthesized at the University of Oslo. Comprised of zirconium-based SBUs, this series of MOFs is particularly stable to water as well as acidic conditions. UiO-66 utilizes a terephthalic acid (aka benzene dicarboxylate) linker that can be functionalized with a variety of groups, such as an amine group (herein known as UiO-66-NH2).

Toxic chemical and chemical warfare agent (CWA) decomposition poses an ongoing challenge in a variety of settings including environmental contamination and chemical weapons release. Pinacolyl methylphosphonofluoridate, which is also known as Soman or GD, and O-ethyl S-(2-diisopropylamino)ethyl methylphosphonothiolate, known as VX; are nerve agents that are among several organophosphorus compounds (OPs) that inhibit acetylcholinesterase (AChE) and are practically difficult to deactivate. OPs also include a number of insecticides and herbicides that can contaminate areas.

Decontamination typically involves thermal decomposition and/or excessive volumes of washing solutions that are time consuming, energy inefficient, and remove equipment from operation. It is also commonly the case that subsequent degradation and treatment of collected waste streams is also required. Many MOFs, including UiO-66-$NH_2$, are active towards toxic chemicals, including chemical warfare agents (CWAs). UiO-66-$NH_2$ has been shown to hydrolyze CWAs such as Soman, mustard agents, and VX. However, MOFs have characteristics similar to inorganic crystalline materials in being generally brittle crystalline powders or particles, so incorporating MOFs into practical devices often presents a problem.

Thus, there exists a need for a new composition that provides the reactivity of a MOF in a pliable and porous matrix. There further exists a need for the use of such a composition in processes to deactivate toxic industrial chemicals and CWAs such as nerve agents.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A composite material is provided that includes an open celled porous polymeric matrix. Metal-organic framework (MOF) domains are dispersed within the open celled porous polymeric matrix, and each of said plurality of MOF domains are in fluid communication with pores in the porous polymeric matrix, the pores defining a pore volume. Thus, the MOFs within the polymer matrix are accessible to fluid flow from the environment external to the polymer matrix, for example, ambient gases and vapors.

A process of chemically modifying/detoxifying a chemical warfare agent or a toxic industrial chemical is also provided. The chemical warfare agent or the toxic industrial chemical is brought into contact with MOF domains. The MOF domains are disposed within a porous open celled foam polymeric matrix, which allows fluid access to the MOF domains from outside the composite material. The porous MOF structure adsorbs and captures toxic chemicals and with sufficient reaction time the MOF chemically modifies the chemical warfare agent or the toxic industrial chemical. The reaction time in some embodiments is comparable to that of the MOF independent of a porous polymeric matrix.

A process for preparing a MOF-porous polymer composite operative herein includes forming a mixture of a polymer and a diluent material, the diluent material being amenable to selective removal from the polymer. MOF domains are then dispersed into the mixture. The diluent material is then selectively removed from the polymer to create pores in the polymer. The pores in the polymer matrix allow fluid communication between the external environment and the MOF domains in the polymer matrix, i.e., toxic chemical gases and vapors can flow through the polymer matrix and be adsorbed and chemically modified within the MOFs.

DETAILED DESCRIPTION OF EMBODIMENTS OF THE INVENTION

Figure 1:
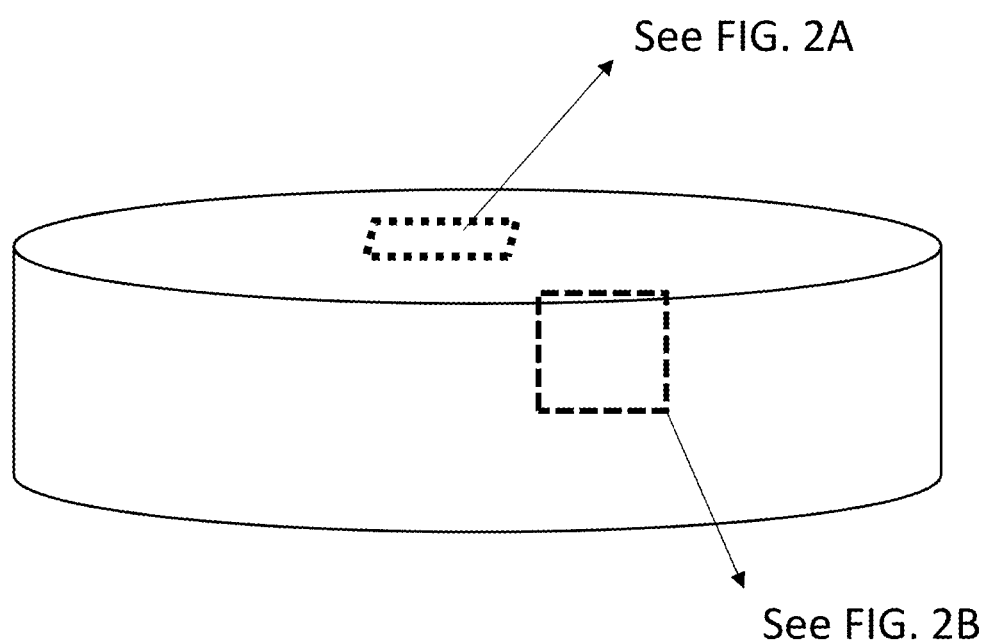
FIG. 1 is a perspective view of an inventive composite formed in a discoid shape with reference to the regions shown in the micrographs of FIGS. 2A and 2B.

The following description of embodiments of the invention is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only.

The invention has utility for the absorption, adsorption, reaction and degradation of toxic chemicals such as OP compounds including nerve agents GD and VX, among other uses that are detailed hereafter. It is surprisingly shown that a porous polymer matrix of the inventive composite allows nerve agents as exemplary toxic chemicals to access the MOF component of the composite such that sorption can occur.

As used herein, "porous polymeric matrix" is defined as a biphasic form containing at least one polymer that has been subjected to selective dissolution or a reticulated foam and is formed by the exemplary processes detailed in U.S. Pat. No. 10,369,248 B2 or R. A. Mrozek, C. S. Gold, B. Leighliter, J. M. Sietins, and J. L. Lenhart; "Open pore, elastomeric scaffolds through frustrated particle collapse" J Mater Sci (2016) 51:10761-10774.

As used herein, "sorption" is defined as a combination of absorption into the porous polymeric matrix, adsorption to the surface of the MOF, and/or chemical reaction on or in the MOF.

A MOF operative herein illustratively includes NU-1000, IRMOF-3, MIL-101-NH$_2$, UiO-66-NH$_2$, UiO-67-NH$_2$, UiO-67(NH$_2$)$_2$, HKUST-1, or a combination thereof. NU-1000 has the partial structural formula [Zr$_6$(µ$_3$-OH)$_8$ (OH)$_8$(PhCOO)$_8$]. IRMOF-3 has the structural formula Zn$_4$O(NH$_2$-BDC)$_3$, where NH$_2$—BDC is 2-amino-1,4-terephthalic acid. MIL-101-NH$_2$ has the structural formula M$_3$O$_X$(NH$_2$—BDC)$_3$, where M is aluminum, iron, or chromium; and X is fluoride or hydroxyl. UiO-66-NH$_2$, UiO-67-NH$_2$, UiO-67-(NH$_2$)$_2$ have the general formula Zr$_6$(O$_4$ (OH)$_4$L$_4$, where L is a ligand of 2-amino-1,4-terephthalic acid, 2-aminodiphenyl phthalate, or 2,2'-diaminodiphenyl phthalate, or combinations thereof. HKUST-1 has the structural formula Cu$_3$(BTC)$_2$(H$_2$O)$_3$xH$_2$O, where BTC is benzene 1,3,5-tricarboxylate. The preparation of NU-1000 is known in the art: J. E. Mondloch, W. Bury, D. Fairen-Jimenez, D. S. Kwon, E. J. DeMarco, M. H. Weston, A. A. Sarjeant, S. T. Nguyen, P. C. Stair, R. Q. Snurr, O. K. Farha, and J. T. Hupp, "Vapor-Phase Metallation by Atomic Layer Deposition in a Metal-Organic Framework" J. Am. Chem. Soc. 2013, 135, 10294. The preparation of IRMOF-3 crystals is known: Y. Yoo and H-K Jeong, "Heteroepitaxial Growth of Isoreticular Metal-Organic Frameworks and Their Hybrid Films", Crystal Growth & Design, 2010, 10(3), 1283-1288. The preparation of MIL-101-NH$_2$ is known: Y. Lin, C. Kong and L. Chen, "Direct synthesis of amine-functionalized MIL-101(Cr) nanoparticles and application for C02 capture", RSC Adv., 2012, 2, 6417-6419. The synthesis of UiO materials is also known to the art: P. M. Schoenecker G. A. Belancik B. E. Grabicka K. S. Walton, "Kinetics study and crystallization process design for scale-up of UiO-66-NH2 synthesis" AICHE J. 2013, 59(4), 1255-1262; M. J. Katz, Z. J. Brown, Y. J. Colón, P. W. Siu, K. A. Scheidt, R. Q. Snurr, J. T. Hupp, and O. K. Farha, "A facile synthesis of UiO-66, UiO-67 and their derivatives", Chem. Commun., 2013, 49, 9449-9451; T. Wittmann, R. Siegel N. Reimer W. Milius, N. Stock, and J. Senker, "Enhancing the Water Stability of Al-MIL-101-NH2 via Postsynthetic Modification", Chem. Eur. J., 2015, 21(1), 314-323; and A. Schaate, P. Roy A. Godt J. Lippke, F. Waltz, M. Wiebcke and P. Behrens, "Modulated Synthesis of Zr-Based Metal-Organic Frameworks: From Nano to Single Crystals", Chem. Eur. J., 2011, 17(24), 6643-6651. The synthesis of HKUST-1 is known to the art: S. S.-Y. Chui, S. M.-F. Lo, J. P. H. Charmant, A. G. Orpen, and I. D. Williams, "A Chemically Functionalizable Nanoporous Material [Cu$_3$(TMA)$_2$(H$_2$ O)$_3$]$_n$,", Science, 1999, 283, 1148-1150. MOF domains are typically present from 5 to 90 total weight percent of an inventive porous composite. MOF-808 is also known in the art: H-Q Zheng, C-Y Liu, X-Y Zeng, J. Chen, J. L-Lin, R. Cao, Z-J Lin, and J-W Su, "MOF-808: A Metal-Organic Framework with Intrinsic Peroxidase-Like Catalytic Activity at Neutral pH for Colorimetric Biosensing" Inorg. Chem., 2018, 57(15), 9096-9104.

The present invention affords higher MOF reactivity and superior strength to the resulting article. The composite of the present invention may be applied to various substrates such as filters, masks and respirators, helmets, protective clothing and suits, vehicles and other surfaces requiring protection from toxic chemicals and ballistic protection.

Polymers suitable for usage as a porous polymeric matrix illustratively include a monomeric polymer illustratively including but not limited to polyimide, polystyrene, polyurethane, or polyvinyl chloride; copolymer illustratively including but not limited to a sulfonated tetrafluoroethylene, styrene-butadiene-styrene, styrene-isoprene-styrene, acrylonitrile-butadine-styrene, styrene-ethylene-butadiene-styrene, styrene-ethylene-propylene-styrene; an elastomer illustratively including but not limited to polydimethylsiloxane, polychloroprene, polyurethane, nitrile, and latex; an alkylene such as low-density polyethylene, first grade polyethylene, polypropylene; or water soluble polymers illustratively including but not limited to albumin, polyvinyl alcohol, polyethylenimine, polyvinylpyrrolidone, ethylene-vinyl acetate, polyethylene-vinyl acetate.

To form an inventive porous polymeric composition or article containing at least one MOF, a polymeric matrix is mixed with a substance that is selectively separable therefrom, so as to create a porous matrix from the remaining polymer when the substance is separated therefrom. Diluents for a polymer are limited only by being compatible with the MOF(s) therein in order to retain reactivity of the MOF during diluent removal. By adjusting the volume ratio of the diluent to the polymer, the degree of porosity is controlled. In some inventive embodiments, the amount of diluent is selected such that the remaining MOF after diluent removal is at or exceeds the percolation threshold. Diluents operative herein illustratively include mineral oil; proteins such as albumin, globulins, and combinations thereof; gels such as gelatin, agar, agarose, and combinations thereof; waxes such as paraffin, beeswax, vegetable-based waxes; fats such as tallow, lard, lanolin, and combinations thereof; polyanhydrides; and polylactides.

In some embodiments of the present invention, the MOF is incorporated into a polymeric matrix that has a selectively removable component. With the selective removal of one of the matrix components a porous polymeric matrix is created containing the MOF domains therein, with the proviso that the MOF domains retain reactivity toward the target molecule, such as an OP. Selective removal is readily accomplished with solvents, supercritical solvents, plasma to selectively degrade a matrix component, for example by ozonolysis, proteolytic enzyme solutions, aqueous acid, aqueous base, each alone or in combination with a lixiviant.

A variety of design variables allow one of skill in the art numerous choices in forming a material as to strength, shape, and reactive selectivity. These design variables include at least: choice of a polymer for the porous matrix, the degree of porosity, the MOF, the quantity of MOF, and the shape of the article. As a result, considerable advantages as to structure and strength are achieved relative to MOFs alone or in a foamed matrix.

The inventive composite material is readily integrated into equipment for military personnel and first responders. As a material having a porous matrix through which a fluid gas or liquid can transit, the inventive material is amenable to usage as a filter in equipment such as gas masks and respirators, helmets, or full body protective gear. It is appreciated that the inventive composite is also amenable as a surface coating that passively sorbs and decontaminates OPs or toxic industrial chemicals (TICs). Passive surface decontamination is an attractive option for pieces of equipment and vehicles as the process of decontamination. The inventive material affords the ability to tailor the polymer scaffold chemistry for selective uptake of a given OP or TIC. It is also noted that the inventive composite is quite effective at energy absorption and affords ballistic and shock wave force dissipation from projectiles and explosions, respectively; and regardless of whether the inventive composite is reinforced with fibers such as aramid.

In addition to the threat of direct contact with a gaseous agent during an attack or environmental release, surfaces that are exposed to a gas may retain their toxicity for long periods of time after the exposure. For example, OP nerve agents are soluble in materials such as paint, plastics, and rubber, allowing agents to remain in those materials and be released (offgas) over long time periods. Nerve agents with thickening agents are even more persistent and difficult to decontaminate from a painted surface such as a wall, vehicle, or even surfaces such as a computer keyboard. It is understood that on painted metal surfaces, Soman may persist for from one to five days, and that the less volatile VX may persist for 12 to 15 days. Under certain environmental conditions, OPs have been shown to persist indefinitely. On surfaces that are convoluted such as the surface of a military vehicle, the hidden surfaces that are less exposed to the environment can be especially difficult to decontaminate. Decontamination also requires detection, which is often not possible, and so resources and time may be wasted treating uncontaminated surfaces. The present invention also addresses the potential of long delays before decontamination can be completed by allowing this process to occur passively on surfaces protected the inventive compositions. Therefore, passive decontamination using the inventive composite materials is an attractive alternative to active decontamination requiring manpower, time and decontamination materials and resources.

The present invention is further detailed with respect to the following non-limiting examples. These examples are not intended to limit the scope of the invention but rather highlight properties of specific inventive embodiments and the superior performance thereof relative to comparative examples.

Example 1: Preparation of MOF in Porous Polymeric Matrix

A composition or article is formed according to one embodiment of the present invention by first mixing 20 volume percent poly(styrene-b-ethylene-co-butylene-b-styrene) (SEBS; G1652MU) obtained from Kraton Corporation along with 80 volume percent mineral oil obtained from McMaster-Carr. The SEBS-mineral oil mixture is heated to 120° C. and mixed until it becomes a viscous melt that is visually homogeneous. Either 70 or 75 total weight percent UiO-66-NH2, respectively, are added to the SEBS-mineral oil, heated to 120° C., and mixed manually using a wooden spatula until homogeneous. The material is then placed in disc shaped molds and allowed to cool to room temperature for 15 min as shown schematically in FIG. 1. During cooling, the SEBS domains phase separate to form physical crosslinks resulting in a UiO-66-NH2 filled matrix. The disc is then submersed in 1-butanol to extract the mineral oil. The samples are transferred to new portions of 1-butanol every three days for 9 days. The samples are then removed from the 1-butanol, dried in the fume hood for 6 hours, and then placed in an oven at 40° C. overnight to evaporate the remaining l-butanol and produce the UiO-66-NH2-filled SEBS porous polymeric structure.

Example 2: SEM Characterization

Figures 2A, 2B:
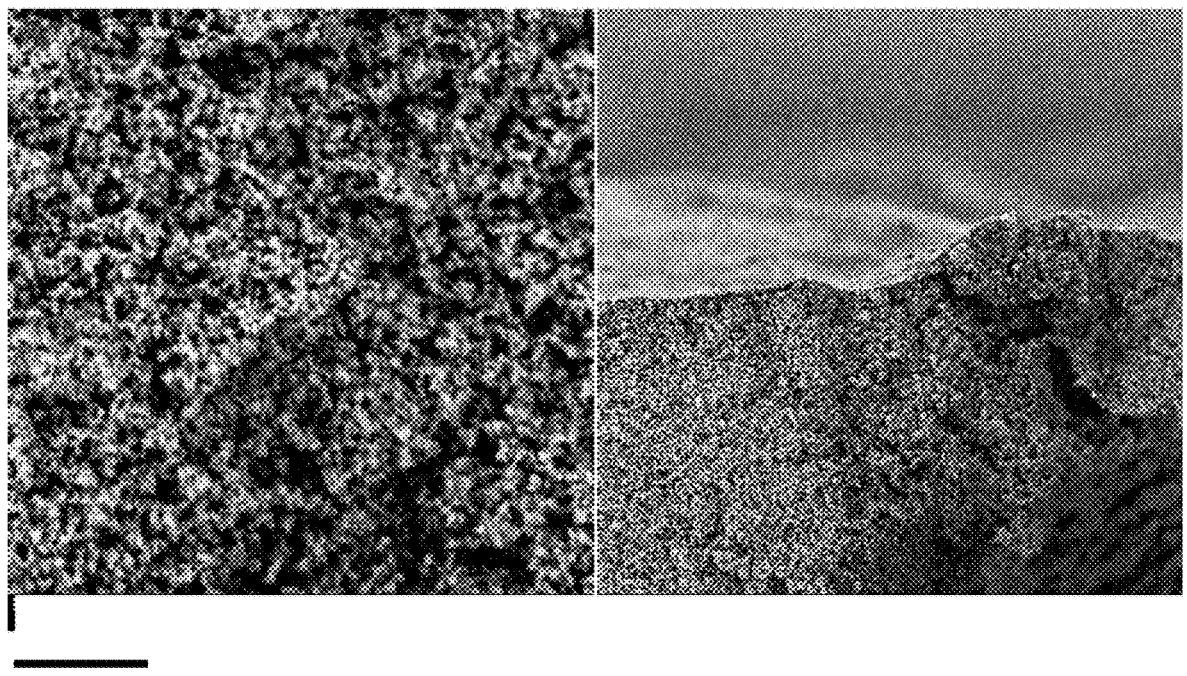
FIG. 2A is an SEM micrograph of an inventive UiO-66-NH$_2$/styrene-ethylene-butadiene-styrene (SEBS) foam composite in a top to bottom view of a 3 cm discoid, where the length bar immediately beneath the micrograph represents 5 microns.
FIG. 2B is an SEM micrograph of an inventive UiO-66-NH$_2$/SEBS foam composite of FIG. 2A in a cross-sectional view, where the length scale bar immediately beneath the micrograph represents 23 microns.

The 75 weight percent UiO-66-NH$_2$/SEBS composite of Example 1 was subjected to scanning electron microscopy (SEM) with FIG. 2A being a top-down view of the discoid of FIG. 1, and FIG. 2B being a cross-sectional view of FIG. 1. The high degree of porosity is noted. The scale bars in FIGS. 2A and 2B are 5 and 23 microns, respectively.

Example 3: PXRD Characterization

Figure 3:
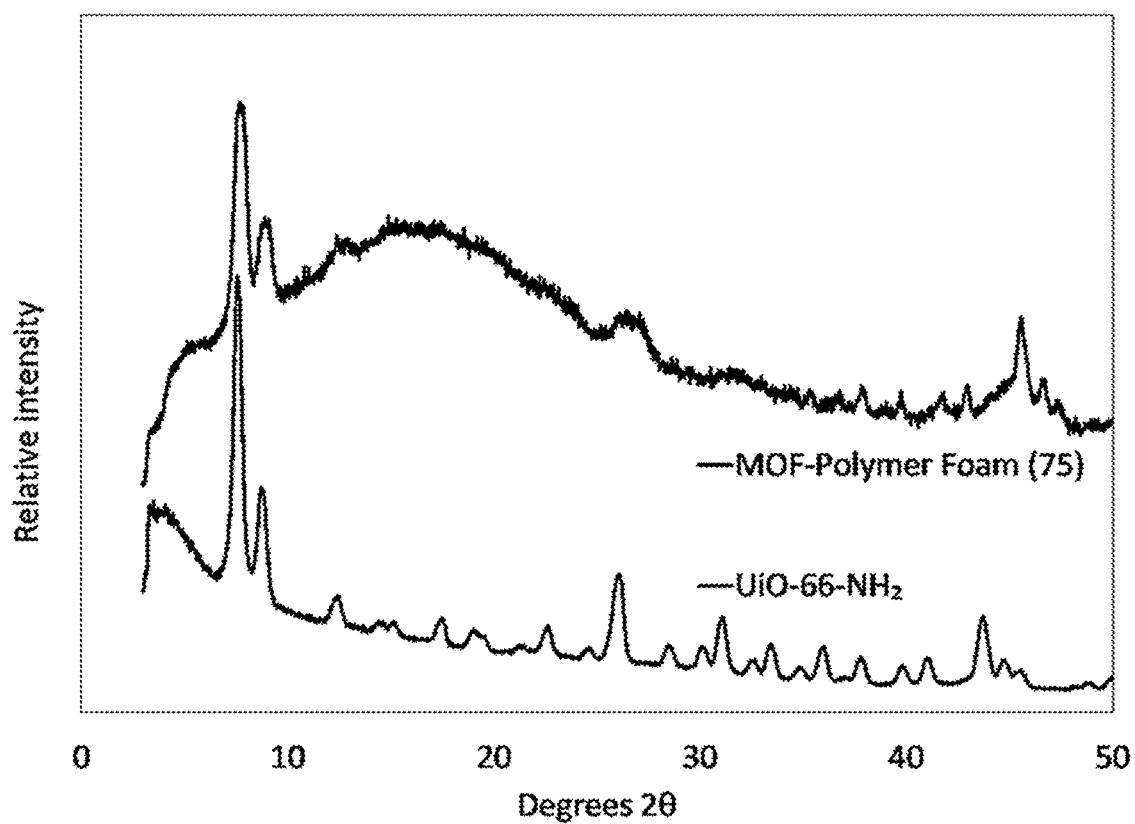
FIG. 3 shows powder x-ray diffraction patterns of the inventive 75 total weight percent UiO-66-NH$_2$ in SEBS foam composite of FIG. 2A, and independent MOF UiO-66NH$_2$.

The 75 weight percent UiO-66-NH$_2$/SEBS composite of Example 1 is subjected to powder x-ray diffraction (PXRD)

as shown in FIG. 3. The major peaks associated with long-range order of the MOF at 7.6° and 8.8° 2θ are retained in the porous SEBS matrix as shown in the upper spectrum and indicates the structure remains intact. The signal to noise is higher due to the presence of large quantities of amorphous polymer. The lower spectrum is that of UiO-66-NH$_2$ powder alone for comparison.

Example 4: Surface Areas and Pore Volume Characterization

Figure 4:
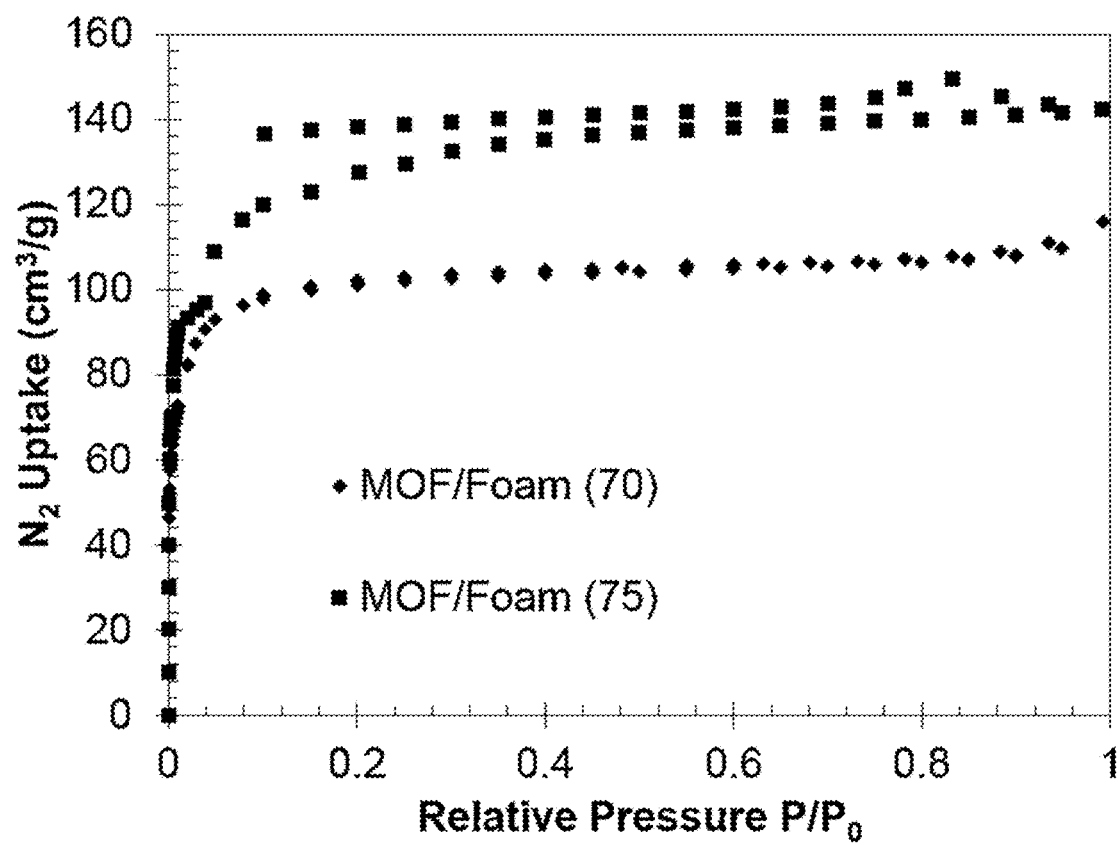
FIG. 4 is plot of nitrogen isotherms for 70 total weight percent and 75 total weight percent UiO-66-NH$_2$ in SEBS foam composite material.

The 70 and 75 weight percent UiO-66-NH$_2$/SEBS composites of Example 1 were subjected to nitrogen adsorption and nitrogen (N$_2$) isotherms as shown in FIG. 4. Nitrogen is still able to access the pores of the MOF indicating that: (1) the MOF structure remains intact, and (2) the pores are not blocked by the porous polymer matrix. The surface area was measured by Brunauer-Emmett-Teller (BET) analysis and pore volume is provided in Table 1 for the 70% and 75% UiO-66-NH2/SEBS composites. Approximately 25-40% of the surface area and pore volume of the MOF remains accessible within the matrix.

TABLE 1

| Material | BET (m$^2$/g) | Pore Vol. (cm$^3$/g) |
| --- | --- | --- |
| MOF/Foam (70) | 399 | 0.16 |
| MOF/Foam (75) | 527 | 0.21 |
| UiO-66-NH$_2$ | 1350 | 0.51 |

Example 5: Soman Sorption and Degradation

The 75 weight percent UiO-66-NH$_2$/SEBS composites of Example 1 were dosed with Soman (GD). Dosing is done with 5 µL of GD onto 50 mg of material. After 24 hours, the material is extracted with acetonitrile. The amount recovered is compared to the amount dosed and is used to calculate the percent of GD removed by the composite. Results are shown in Table 2 for the intact matrix containing the MOF and the crush matrix. The baseline MOF without a matrix removes 91% GD after 24 hours, whereas the composite foams remove 94-95% GD in 24 hours. These results are within experimental error of the test and indicate that the composite is still efficient at removing GD.

TABLE 2

GD Dose-Extraction in inventive MOF matrix composite.

| Material | GD Removed |
| --- | --- |
| UiO-66-NH$_2$ | 91% |
| MOF/matrix (75) | 95% |
| MOF/matrix (75), crushed | 94% |

Figure 5A:
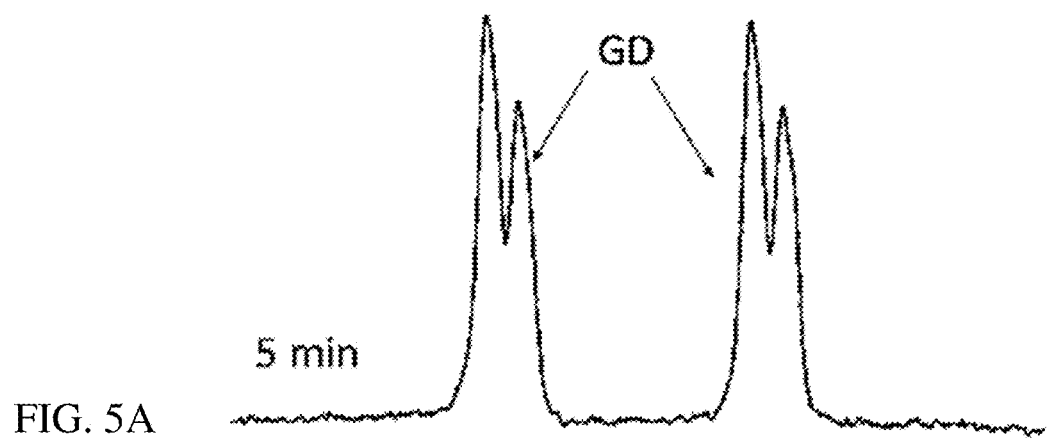
FIGS. 5A-5C are a series of time lapsed $^{31}$P solid state NMR spectra of Soman (GD) dosed to the material shown FIG. 3 showing the degradation of GD from 5 min (FIG. 5A) to 301 min (FIG. 5B) to 813 min (FIG. 5C) to pinacolyl methylphosphonic acid (PMPA)
Figure 5B:
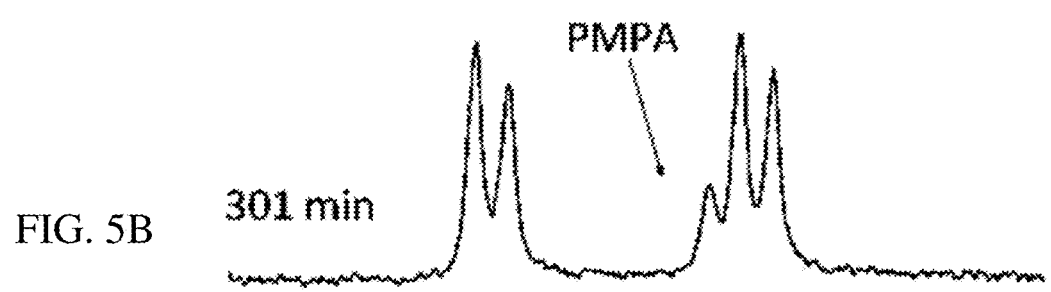
Figure 5C:
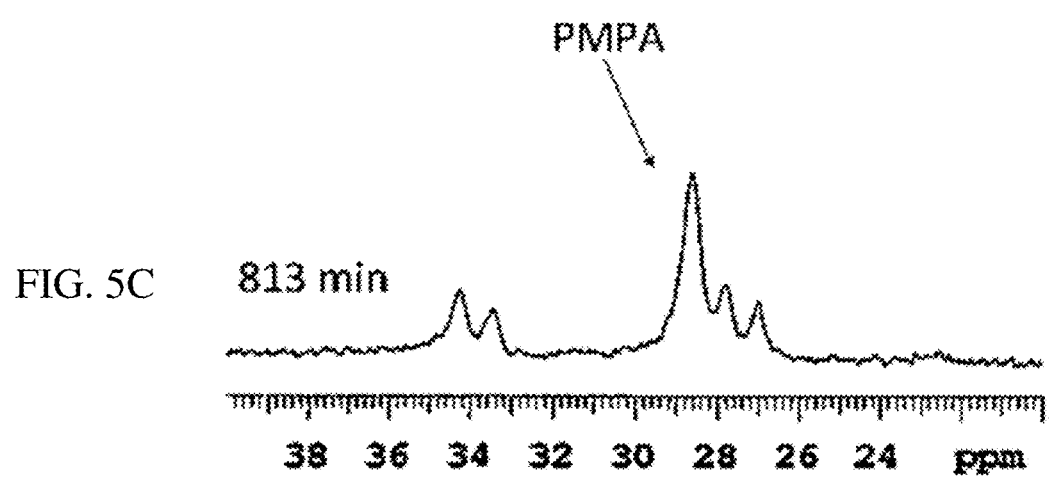
Figure 6:
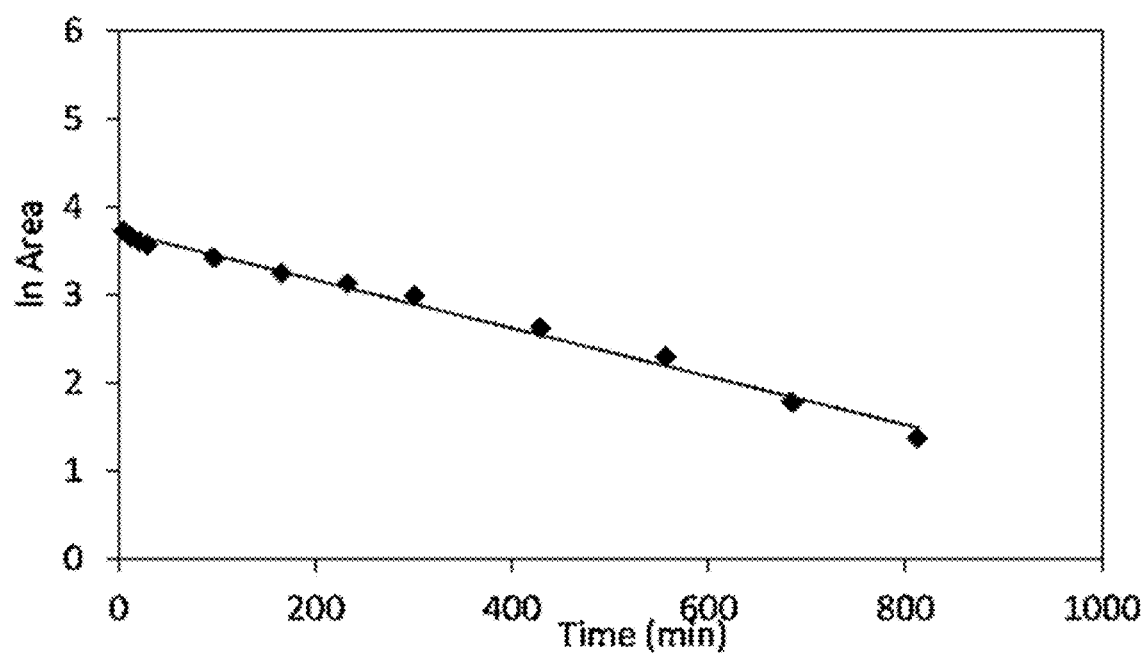
FIG. 6 is a natural log plot of area under the curves from NMR spectra as a function of time for a series of NMR plots including those of FIGS. 5A-5C.

The rate of removal of GD by the foam composite is evaluated using $^{31}$P solid-state nuclear magnetic resonance (SS NMR). 6 µL of GD is dosed to 60 mg of the MOF/matrix (75) composite, which is pre-equilibrated at 50% relative humidity (RH), in an NMR rotor. The GD shows up as two sets of doublet peaks as noted in FIG. 5. Pinacolyl methylphosphonic acid (PMPA) appears at approximately 28.5 ppm. FIG. 6 shows the conversion as a function of time. The GD half-life was calculated from the slope of the curve and was found to be 253 min. This compares to the baseline MOF, which was previously measured to have a half-life of 315 min. The surprising enhancement is likely due to the high macroporosity of the composite serving as transport pores for GD to the MOF.

Example 6: Resistance of Composite to Nitrogen Dioxide Breakthrough

Figure 7:
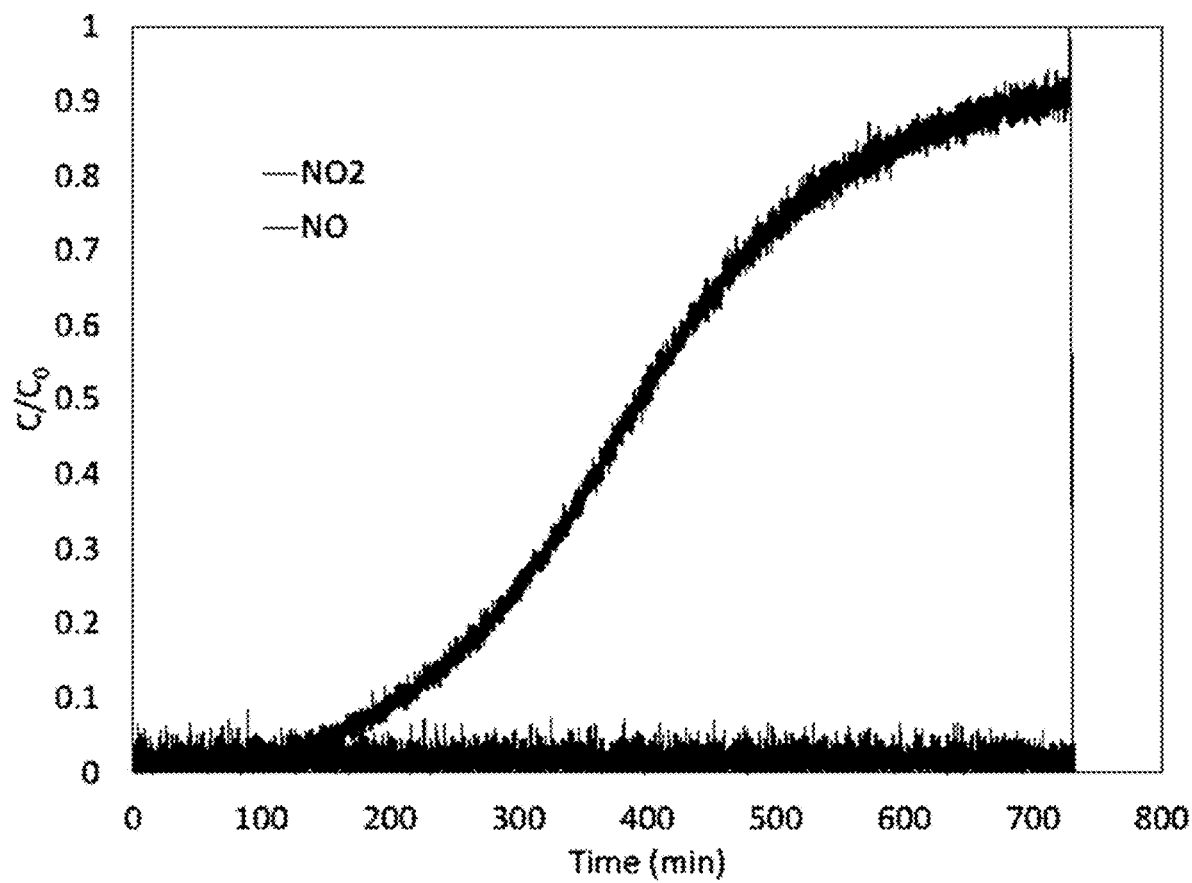
FIG. 7 is a normalized plot of nitrogen dioxide breakthrough as a function of time.

The 75 weight percent UiO-66-NH$_2$/SEBS composite of Example 1 was also evaluated against toxic industrial chemical (TIC) vapors such as nitrogen dioxide and chlorine. For example, the UiO-66-NH2 MOF is excellent for removing chlorine and nitrogen dioxide. Nitrogen dioxide breakthrough data are shown in FIG. 7 in the upper curve and the lower curve is for nitric oxide (NO). The composite is challenged with a nitrogen dioxide concentration of 1,000 mg/m$^3$ at a dry relative humidity (RH). Breakthrough occurs as NO2 and almost no nitric oxide is formed as observed in the lower curve. The resulting loading was 16.1 mol/kg.

The test was repeated with chlorine gas with similar results to FIG. 7.

Patents and publications mentioned in the specification are indicative of the levels of those skilled in the art to which the invention pertains. These patents and publications are incorporated herein by reference to the same extent as if each individual application or publication was specifically and individually incorporated herein by reference for the entirety of their teaching.

The foregoing description is illustrative of particular embodiments of the invention, but is not meant to be a limitation upon the practice thereof. The following claims, including all equivalents thereof, are intended to define the scope of the invention.

The invention claimed is:

1. A composite material, comprising:
    a porous open celled foam polymeric matrix; and
    a plurality of metal-organic framework (MOF) domains within said porous open celled foam polymeric matrix, each of said plurality of MOF domains in fluid communication with pores in said porous open celled foam polymeric matrix so that gases and vapors external to the composite can access the MOF domains, and wherein said MOF is selected from the group consisting of NU-1000, UiO-66-NH$_2$, UiO-67-NH$_2$, UiO-67 (NH$_2$)$_2$, MOF-808, or a combination thereof.

2. The composite material of claim 1, wherein said plurality of MOF domains comprise from 5 to 90 total weight percent of the composite material.

3. The composite material of claim 1, wherein said MOF is UiO-66-NH$_2$.

4. The composite material of claim 3, wherein said porous open celled foam polymeric matrix comprises poly(styrene-ethylene-butylene-styrene).

5. The composite material of claim 1, wherein said porous open celled foam polymeric matrix comprises at least one of polyimide, polystyrene, polyurethane, polyvinyl chloride (PVC), a poly(sulfonated tetrafluoroethylene), poly(styrene-butadiene-styrene) (SBS), poly(styrene-isoprene-styrene) (SIS), poly(acrylonitrile-butadiene-styrene) (ABS), poly (styrene-ethylene-butadiene-styrene) (SEBS), poly(styrene-ethylene-propylene-styrene) (SEPS), polydimethylsiloxane, polychloroprene, polyurethane, nitrile, latex, low-density polyethylene (LDPE), first grade polyethylene (PE), polypropylene (PP), albumin, polyvinyl alcohol (PVA), polyethyleneimine (PEI), polyvinylpyrrolidone (PVP), ethylene-vinyl acetate (EVA), polyethylene-vinyl acetate (PEVA), or a combination thereof.

6. The composite material of claim 1, wherein said porous open celled foam polymeric matrix has a morphology defined by selective separation of a diluent to produce the porous or open celled polymer matrix.

7. The composite material of claim 1, wherein said composite has a pore volume of 0.16-0.21 cm$^3$/g.

8. The composite material of claim 1, further comprising a substrate, said substrate having the form of a filter, a mask, a helmet, protective clothing or suit, or a vehicle.

9. A process of chemically modifying/detoxifying a chemical warfare agent or a toxic industrial chemical, comprising:
   bringing the chemical warfare agent or the toxic industrial chemical into contact with a composite material comprising:
      a porous open celled foam Polymeric matrix; and
      a plurality of metal-organic framework (MOF) domains within said porous open celled foam polymeric matrix, each of said plurality of MOF domains in fluid communication with pores in said porous open celled foam polymeric matrix so that gases and vapors external to the composite can access the MOF domains, and wherein said MOF is selected from the group consisting of NU-1000, UiO-66-NH$_2$, UiO-67-NH$_2$, UiO-67(NH$_2$)$_2$, MOF-808, or a combination thereof; and
   wherein said MOF adsorbs the chemical warfare agent or the toxic industrial chemical and chemically modifies the chemical warfare agent or the toxic industrial chemical.

10. The process of claim 9, wherein bringing the chemical warfare agent or the toxic industrial chemical into contact with the composite material is done by flowing air containing the chemical warfare agent or toxic industrial chemical through the composite material.

11. The process of claim 9, wherein the chemical modification is by hydrolysis reaction.

12. The process of claim 9, wherein the chemical modification is by oxidation reaction.

13. The process of claim 9, wherein the chemical modification is by elimination reaction.

14. The process of claim 9, wherein the chemical warfare agent or the toxic industrial chemical is an organophosphorus compound.

15. The process of claim 9, wherein the chemical warfare agent is selected from the group consisting of Soman, VX, and a mustard agent.

16. The process of claim 9, wherein the chemical warfare agent or the toxic industrial chemical is chlorine.

17. The process of claim 9, wherein the toxic industrial chemical is nitrogen dioxide.

* * * * *